(12) United States Patent
Desai et al.

(10) Patent No.: US 11,822,610 B2
(45) Date of Patent: *Nov. 21, 2023

(54) SYSTEM, METHOD, AND RECORDING MEDIUM FOR DATA MINING BETWEEN PRIVATE AND PUBLIC DOMAINS

(71) Applicant: International Business Machines Corporation, Armonk, NY (US)

(72) Inventors: Nirmit V. Desai, Yorktown Heights, NY (US); Bong Jun Ko, Harrington Park, NJ (US); Jorge J. Ortiz, Yorktown Heights, NY (US); Swati Rallapalli, Ossining, NY (US); Theodoros Salonidis, Boston, MA (US); Rahul Urgaonkar, Yorktown Heights, NY (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 16/408,782

(22) Filed: May 10, 2019

(65) Prior Publication Data

US 2019/0272299 A1 Sep. 5, 2019

Related U.S. Application Data

(63) Continuation of application No. 15/187,191, filed on Jun. 20, 2016, now Pat. No. 10,394,912.

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/2465* (2019.01); *G06F 16/25* (2019.01)

(58) Field of Classification Search
CPC ............. G06F 16/24542; G06F 16/258; G06F 16/3329; G06F 16/3338; G06F 16/36;
(Continued)

(56) References Cited

U.S. PATENT DOCUMENTS 5,754,938 A * 5/1998 Herz .................... G06Q 20/383
725/116
6,009,475 A 12/1999 Shrader
(Continued)

OTHER PUBLICATIONS

Mel, et al. "The NIST Definition of Cloud Computing". Recommendations of the National Institute of Standards and Technology. Nov. 16, 2015.
(Continued)

*Primary Examiner* — Shyue Jiunn Hwa
(74) *Attorney, Agent, or Firm* — Samuel Waldbaum; MCGINN I.P. LAW GROUP, PLLC.

(57) ABSTRACT

A data mining method, system, and non-transitory computer readable medium, include defining a set of filter constraints as a filter function for clustering users' private records of data of a private domain, selecting a subset of users' public records of data from a filtered set of data from a public domain that is common with the users' private records of data, and creating a data file including the matched user of the private domain to the public records of the user of the private domain, where the set of the filter constraints comprises a function that captures the subset of the users' public records of data who are of interest to the private domain, and only performs data mining with that set of information from the public domain.

20 Claims, 6 Drawing Sheets

(51) Int. Cl.
*G06F 16/2458* (2019.01)
*G06F 16/25* (2019.01)

(58) Field of Classification Search
CPC .. G06F 16/367; G06F 16/951; G06F 21/6218;
G06F 3/04842; G06F 3/0485; G06F
40/169; G06F 40/30; G06F 16/243; G06F
16/24575; G06F 16/248; G06F 16/31;
G06F 16/35; G06F 16/38; G06F 16/955;
G06F 40/117; G06F 40/166; G06F
40/194; G06F 40/205; G06F 40/253;
G06F 40/295; G06F 16/211; G06F
16/219; G06F 16/3325; G06F 16/337;
G06F 21/62; G06F 16/24578; G06F
16/254; G06F 16/285; G06F 16/353;
G06F 16/435; G06F 16/93; G06F
16/9535; G06F 21/6227; G06F 2216/01;
G06F 2216/03; G06F 16/284; G06F
16/41; G06F 21/31; G06F 9/06; G06F
21/10; G06F 21/552; G06F 21/602; G06F
21/64; G06F 2221/0728; G06F 11/3466;
G06F 11/3688; G06F 11/3692; G06F
16/972; G06F 2209/5016; G06F
2209/506; G06F 3/162; G06F 8/24; G06F
9/466; G06F 9/5038; G06F 3/0482; G06F
16/2428; G06F 16/3331; G06F 8/65;
G06F 16/3326; G06F 16/335; G06F
16/957; G06F 21/6245; G06F 21/6263;
G06F 16/00; G06F 16/23; G06F 16/24;
G06F 16/245; G06F 16/2453; G06F
16/24573; G06F 16/287; G06F 16/289;
G06F 16/3334; G06F 16/903; G06F
21/604; G06F 2221/2113; G06F
2221/2141; G06F 2221/2149; G06F
3/0484; G06F 40/14; G06F 16/20; G06F
16/27; G06F 16/95; G06F 21/577; G06F
16/22; G06F 16/2465; G01W 1/02;
G01W 1/10; H04W 4/02; H04W 4/029;
H04L 2101/69; H04L 61/4511; H04L
61/59; H04L 67/51; H04L 67/52; H04L
2209/56; H04L 63/1433; H04L 9/088;
H04L 9/0891; H04L 9/3247; H04L
9/3252; G06N 20/00; G06N 20/20; G06N
5/047; G06Q 50/18; G06Q 50/184
See application file for complete search history.

(56) References Cited

U.S. PATENT DOCUMENTS

| 8,316,237 | B1 | 11/2012 | Felsher et al. | |
|---|---|---|---|---|
| 9,043,358 | B2 | 5/2015 | Cheng et al. | |
| 10,133,791 | B1 | 11/2018 | Chan | |
| 2004/0148290 | A1 | 7/2004 | Merenda et al. | |
| 2006/0282372 | A1* | 12/2006 | Endres | G06Q 40/025 |
| | | | | 705/76 |
| 2008/0168135 | A1* | 7/2008 | Redlich | G06F 16/282 |
| | | | | 709/204 |
| 2008/0250021 | A1 | 10/2008 | Boys et al. | |
| 2009/0254971 | A1* | 10/2009 | Herz | G06Q 30/02 |
| | | | | 726/1 |
| 2009/0282002 | A1 | 11/2009 | Reeder et al. | |
| 2010/0017870 | A1* | 1/2010 | Kargupta | H04L 63/1408 |
| | | | | 709/201 |
| 2011/0208822 | A1* | 8/2011 | Rathod | G06F 16/9535 |
| | | | | 709/206 |
| 2012/0284259 | A1* | 11/2012 | Jehuda | G06F 16/3338 |
| | | | | 707/769 |
| 2012/0316962 | A1* | 12/2012 | Rathod | G06Q 10/107 |
| | | | | 705/14.54 |
| 2014/0344941 | A1 | 11/2014 | Sibert et al. | |
| 2015/0026332 | A1 | 1/2015 | Madani et al. | |
| 2015/0049634 | A1* | 2/2015 | Levchuk | G06Q 50/01 |
| | | | | 370/254 |
| 2015/0207813 | A1* | 7/2015 | Reybok | H04L 63/145 |
| | | | | 726/22 |
| 2016/0314120 | A1 | 10/2016 | Dauderman | |
| 2017/0075877 | A1 | 3/2017 | Lepeltier | |
| 2017/0097951 | A1* | 4/2017 | Nachiappan | G06F 16/25 |

OTHER PUBLICATIONS

United States Notice of Allowance dated Apr. 19, 2019, in U.S. Appl. No. 15/187,191.
United States Office Action dated Sep. 20, 2018, in U.S. Appl. No. 15/187,191.
United States Office Action dated Jun. 12, 2018, in U.S. Appl. No. 15/187,191.
United States Office Action dated Sep. 8, 2022, in co-pending U.S. Appl. No. 17/482,636.
United States Office Action dated Jul. 7, 2023, in co-pending U.S. Appl. No. 17/482,636.
United States Office Action dated Aug. 8, 2023, in co-pending U.S. Appl. No. 17/482,636.

* cited by examiner

SYSTEM, METHOD, AND RECORDING MEDIUM FOR DATA MINING BETWEEN PRIVATE AND PUBLIC DOMAINS

CROSS-REFERENCE TO RELATED APPLICATIONS

The present application is a Continuation Application of U.S. patent application Ser. No. 15/187,191 filed on Jun. 20, 2016, the entire contents of which are hereby incorporated by reference.

BACKGROUND

The present invention relates generally to a data mining method, and more particularly, but not by way of limitation, to a method of providing a filtering function for mining information that combines insights across data that is subject to privacy restrictions (e.g., private domain), and data which is not subject to such restrictions (e.g., public domain).

Many private companies have data about their users (e.g., customers, employees, etc.) which are subject to privacy and other regulations which thereby prevent the companies from moving the data outside the realm of their expertise area (e.g., outside of the company's private domains/servers) such that the identity of the users may be correlated to the private data.

Conventionally, there is a great benefit to obtaining insights about the private companies users from the other public domain information sources such as Facebook®, Twitter®, LinkedIn®, etc., but the companies are not allowed to query about specific users because it can reveal the information that they have about their users which is intended to be private. As a result, the private companies are not able to obtain information about the specific user that they want to learn more details about which is shared in the user's data in the public domain.

Conventional techniques to work around privacy issues use one single database to combat privacy issues by retrieving all data from the public domain to the private domain.

The conventional techniques have a technical problem in that the conventional techniques result in large storage requirements for storing the public data set relevant to the private data and network links of large bandwidth for transferring the entire public data set relevant to the private data between the private domain and public domain.

SUMMARY

In view of the technical problem, the inventors have considered a non-abstract improvement to a computer technology via a technical solution to the technical problem in which a data mining method can create a filtering function to retrieve smaller sets of data from the larger set of public domain data related to the private user data while utilizing distributed networking, storage, and computing techniques thereby resulting in much smaller storage for storing the public data set relevant to the private data as compared to when the entire public data set is to be stored in the private domain, and in network links of smaller bandwidth for transferring the public data set relevant to the private data between the private domain and public domain, as compared to when the entire public data set is to be transferred to the private domain.

In an exemplary embodiment, the present invention can a data mining method, including defining a set of filter constraints as a filter function for clustering users private records of data of a private domain, obtaining a set of data from a public domain by applying the filter function to users public records of data of the public domain, selecting a subset of the users public records of data that is common with the users private records of data, and performing data mining on the selected subset of the users public records of data in combination with the users private records of data to match a user of the private domain to public records of the user of the private domain.

Further, in another exemplary embodiment, the present invention can provide a data mining system, including a processor, and a memory, the memory storing instructions to cause the processor to: define a set of filter constraints as a filter function for clustering users private records of data of a private domain, obtain a set of data from a public domain by applying the filter function to users public records of data of the public domain, select a subset of the users public records of data that is common with the users private records of data, and perform data mining on the selected subset of the users public records of data in combination with the users private records of data to match a user of the private domain to public records of the user of the private domain.

Even further, in another exemplary embodiment, the present invention can provide a non-transitory computer-readable recording medium recording a data mining program, the program causing a computer to perform: defining a set of filter constraints as a filter function for clustering users private records of data of a private domain, obtaining a set of data from a public domain by applying the filter function to users public records of data of the public domain, selecting a subset of the users public records of data that is common with the users private records of data, and performing data mining on the selected subset of the users public records of data in combination with the users private records of data to match a user of the private domain to public records of the user of the private domain.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
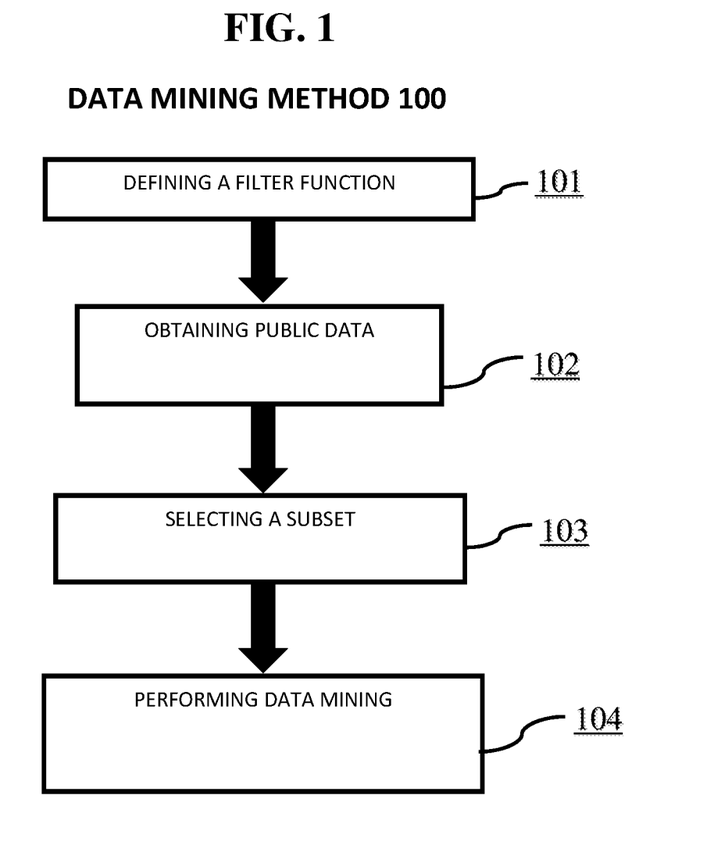
FIG. 1 exemplarily shows a high level flow chart for a data mining method 100.

With reference now to FIG. 1, the data mining method 100 includes various steps to facilitate a private domain owner to combine mining of public data information with its private data without revealing its private data contents by creating a filter function that is large enough to capture most of the composition of the users who are of interest to the private data source, and only query that set of information from the publicly available data to thereby minimize a total amount of data that is to be transferred between the public domain and the private domain while allowing for the preservation of privacy of information.

Figure 5:
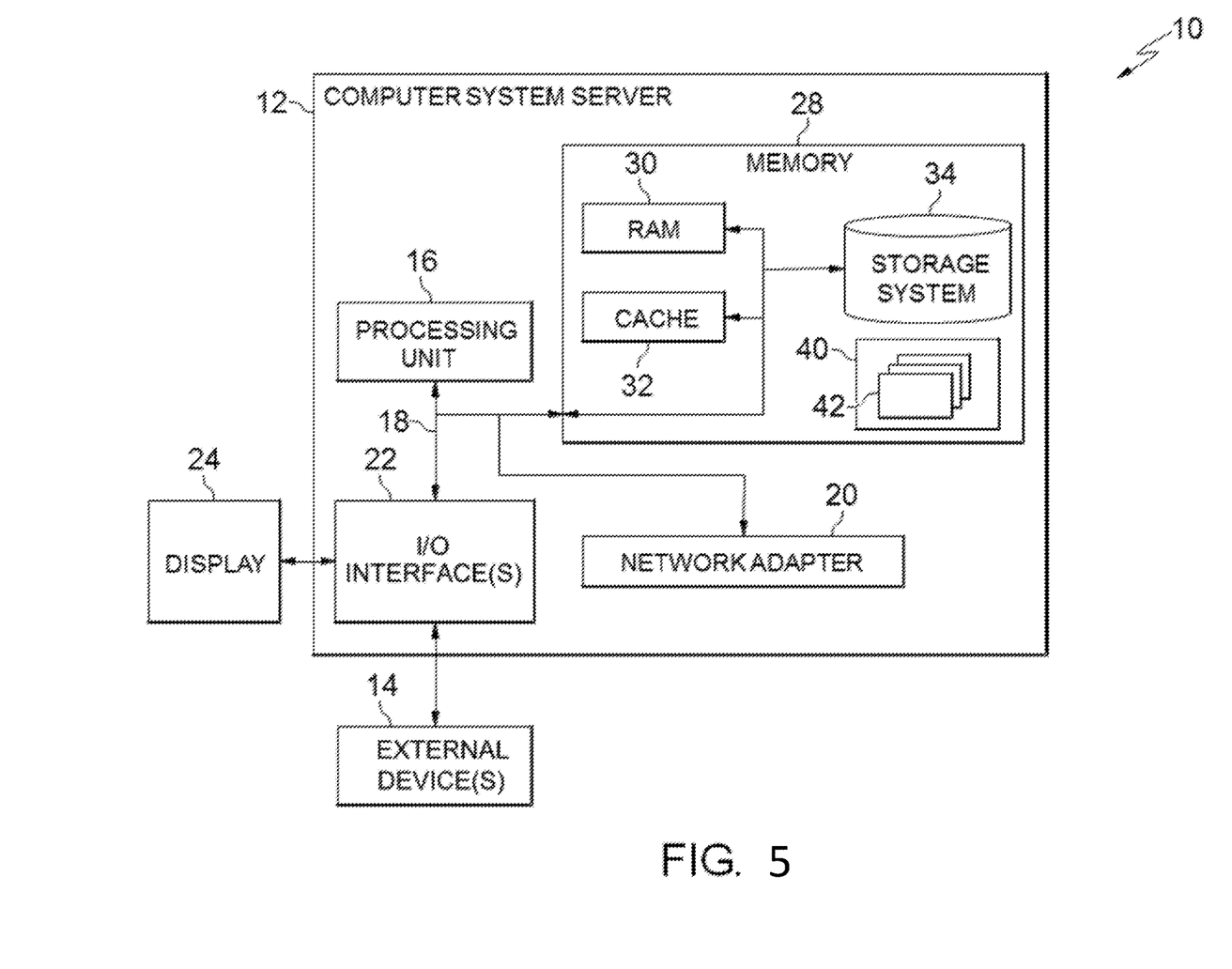
FIG. 5 depicts a cloud computing node according to an embodiment of the present invention.

As shown in at least FIG. 5, one or more computers of a computer system 12 can include a memory 28 having instructions stored in a storage system to perform the steps of FIG. 1.

Figure 6:
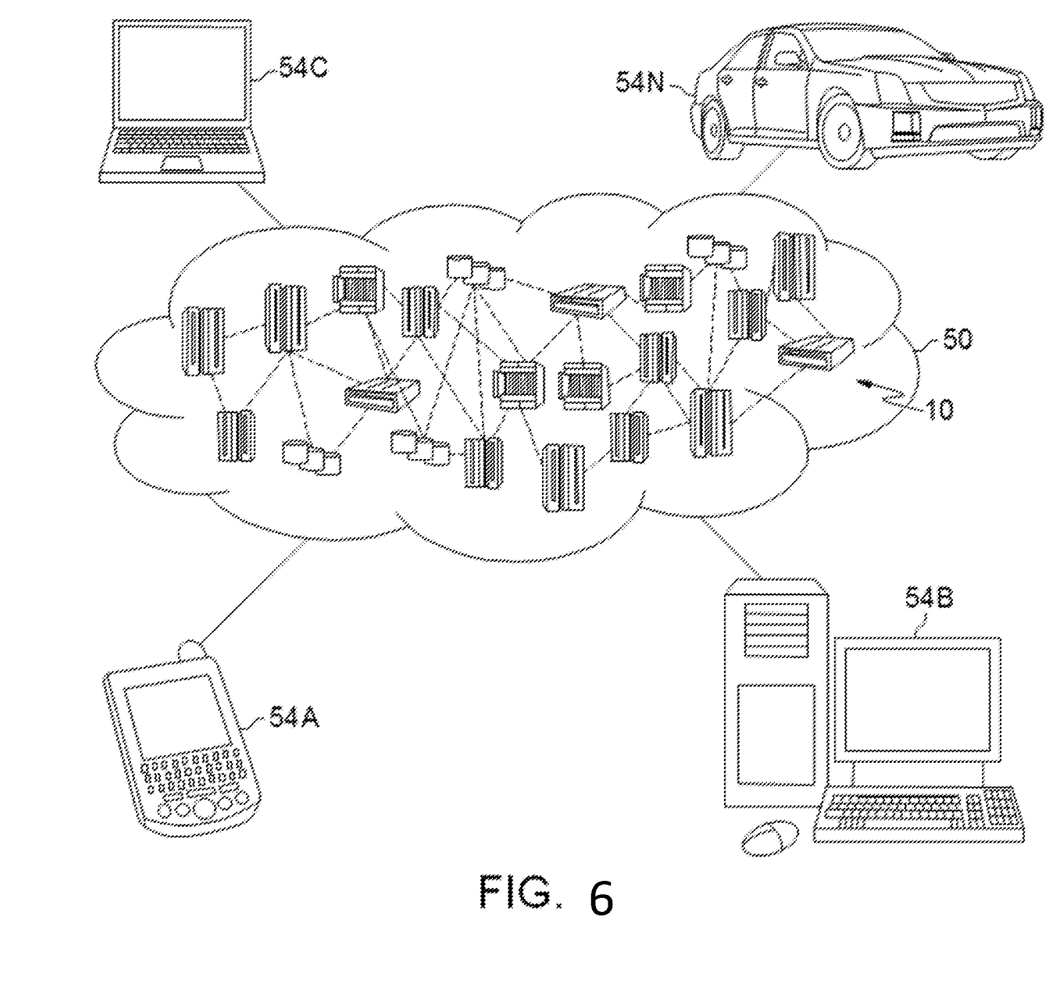
FIG. 6 depicts a cloud computing environment according to another embodiment of the present invention.
Figure 7:
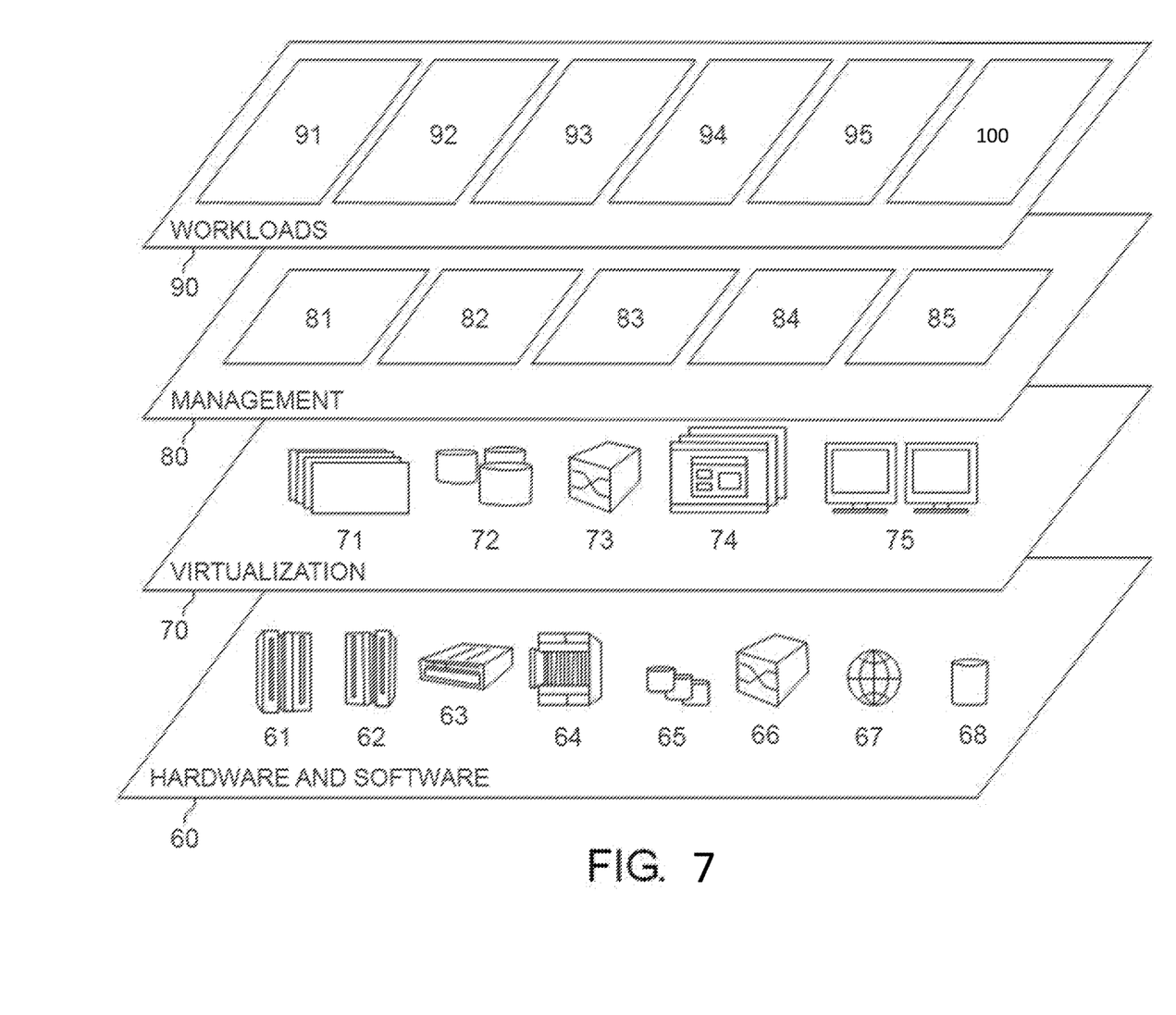
FIG. 7 depicts abstraction model layers according to an embodiment of the present invention.

Although as shown in FIGS. 5-7 and as described later, the computer system/server 12 is exemplarily shown in cloud computing node 10 as a general-purpose computing circuit which may execute in a layer the data mining method and system 100 (FIG. 7), it is noted that the present invention can be implemented outside of the cloud environment.

The method 100 facilitates the mining of data between a private domain owner and a public domain. For example, a private domain owner has information about a set of prospective employees (users) which the private domain owner would like to hire. Regulation prevents the private domain owner from revealing the details of the potential employees that they have at their disposal (e.g., the private domain owner cannot reveal the identity of a person when attempting to mine data about the person). However, for a variety of business purposes, the private domain owner would like to obtain information about the potential employees that is available in the public domain (e.g., information about the social network of the individual). The private domain owner cannot reveal the identity of their potential employees to the external owner of the public domain data (e.g., a social media database owner).

Using representative variables to illustrate the problem facing the private domain owner attempting to retrieve the public domain data using private data of the potential employees, the private user data is a set $S_E$ with N elements $\{E_1 \ldots E_N\}$ in which an element $E_i$ has a set of K attributes $a_i^1$ through $a_i^K$. Each attribute $a_i^1$ through $a_i^K$ represents a specific attribute about a user such as what school they attended, age, social security number, preferences, etc. The public domain data set is represented as $S_P$ with M elements $\{P_1 \ldots P_M\}$ where M is much larger than N (e.g., M>>N) in which an Element $P_h$ in the public domain data has a set of J attributes $b_h^1$ through $b_h^J$. Of course, some of the elements in the public domain data set overlap with the elements of the private data set but the number of elements of the public domain data set is typically much larger than the number of attributes in the private data set that overlap (e.g., in common).

Step 101 defines a set of filter constraints (e.g., a filter function) that clusters user's records of data into larger groups which would allow the private domain owner to receive the attributes and relationships of all the elements in the public data set that are common with its private data set without revealing the individual identity of the users. That is, Step 101 defines a filter function to obtain data in common with the private user data by setting $S_N$ such that $S_N$ is a superset of $S_E$ and a subset of $S_P$. In other words, $S_N$ is a filter that will include all of the private data of the users in the private domain, but which is less than all of the data of the public domain. Step 101 can define the set of filter constraints using clustering algorithms among the users.

Figure 2:
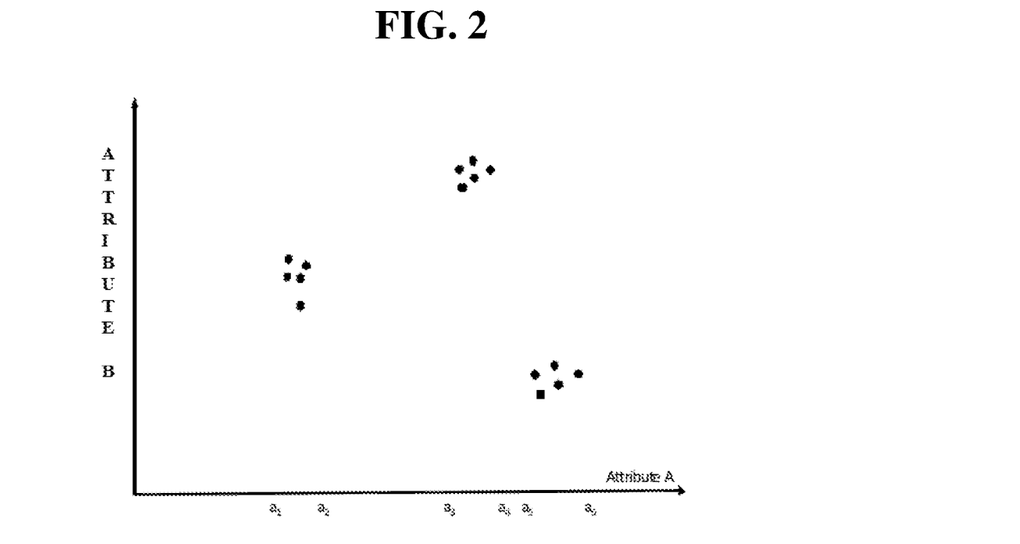
FIG. 2 exemplarily depicts clusters of user data in the private domain.
Figure 3:
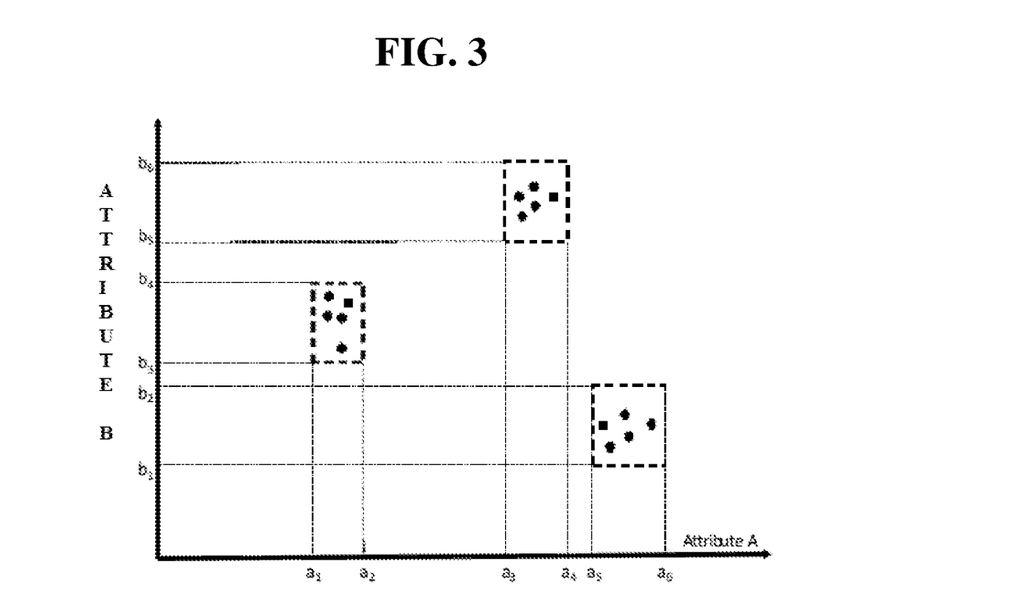
FIG. 3 exemplarily depicts a step (e.g., Step 101) of defining a filter function for the clusters of user data in the private domain.
Figure 4:
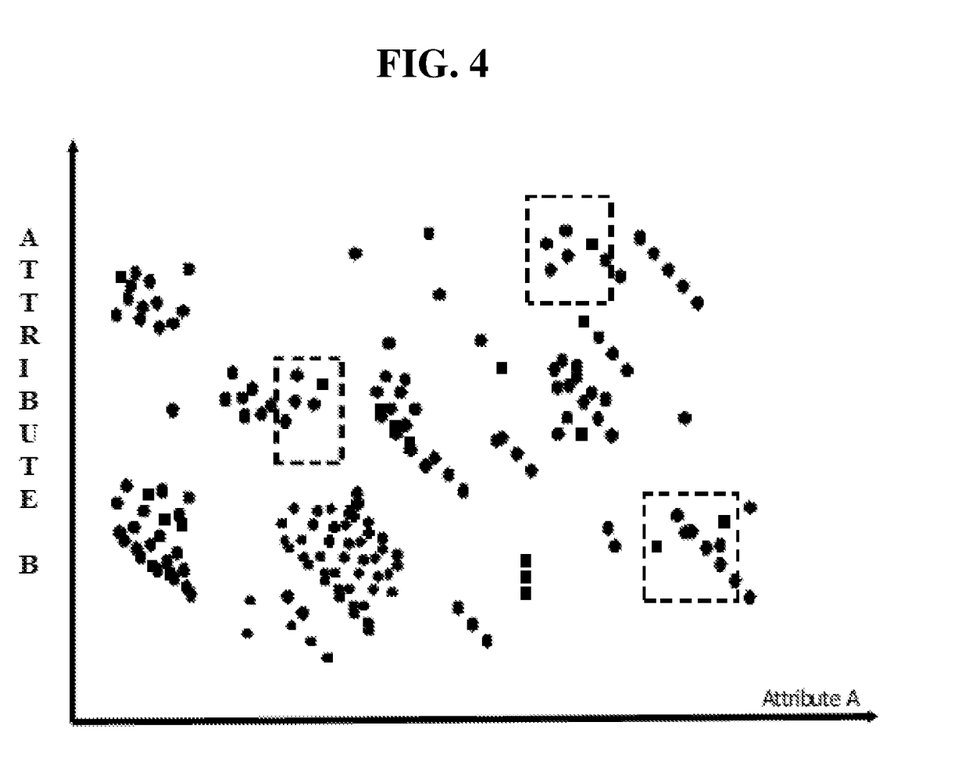
FIG. 4 exemplarily depicts a step (e.g., Step 102) of applying the filter function to the public data set.

FIG. 2 exemplarily depicts clusters of users in the private domain. Step 101 can identify that each of the users of the private data that the private data server owner would like to receive public domain data from attended five universities (e.g., between $a_1$ and $a_2$ and in the public domain between $b_3$ and $b_4$ as shown in FIG. 3). Step 101 would define a filter constraint as to only receive data of users from the public domain who attended the five universities (e.g., a cluster in the public domain where $a_1<A<a_2$ and $b_3<B<b_4$ as shown in FIG. 4). The five university filter constraint defined by Step 101 would allow the private domain to receive the data from the public domain for the users along with other users that the private domain does not require to maintain the anonymity of the private domain users (e.g., FIG. 4 depicts the returned cluster of users via Steps 102 and 103 as described later being larger than the cluster of users in the private database).

Step 101 can also negotiate (e.g., send a set of filter constraints and cancel the receipt of the data if data to be received is too large) the set of filter constraints so that the size of the resulting public data is below a threshold. In other words, the data of the public domain for all users who attended the five universities may still be too large for the private domain to efficiently handle. Thus, Step 101 can create a second set of filter constraints in which data related to particular graduation years of the five universities is received. Step 101 can continuously define more sets of filter constraints to limit the size of received data from the public domain.

That is, the private domain owner sends the set of filtering constraints to the public domain owner of the public data system and checks the size of public data set that will be returned. If the size is too large for the private domain to process, Step 101 refines the set of filter constraints (e.g., reduce the size of each cluster, or eliminate some of the smaller clusters) so that Step 101 can request the size of public data that is manageable, and still be sufficient for it to process the attributes of the private data owners.

In another embodiment, the negotiation and/or obtaining of data can be done by sending a piece of computation from the private domain to the owner of the public cloud data site. Further, specific obfuscation and aggregation functions can be used in the negotiation to optimize the size of the obtained public records data set. For example, if the set of constraints that overlaps with all of the private user data includes the five universities, the negotiating will use an obfuscation function by using more than five universities as the set of constraints for defining the filtering function such that the private domain user's identity is hidden (i.e., obfuscated).

Alternatively, Step 101 can define the set of filter constraints based on a known size of the public domain data and an average size of data per record. In this manner, Step 101 can define a set of filters to limit the total amount of received data below a threshold value based on the average size of data. For example, if the private domain can process 1 terabyte of data and the average size of data for each user is 10 gigabytes, Step 101 would define a set of filter constraints to receive a maximum of 100 (e.g., 100 gigabytes=1 terabyte) public domain user data sets.

Further, Step 101 can define the set of filter constraints to minimize the number of returned data points for the users beyond the people of interest. That is, the set of filter constraints are set to maintain anonymity of the users that the data is being retrieved for (e.g., set of constraints needs to retrieve data for users not included in the private data). Preferably, the set of filter constraints are defined by Step 101 such that the retrieved data set from the public domain is within a 1.05 factor of the users of the private domain. That is, the 1.05 factor is set such that the 5% difference between the users of the private domain and the users in the public domain protects the identity of the users. Or, Step 101 can define the set of filter constraints based on the network connection limitations of the connection between the public domain and the private domain.

Step 102 obtains a set of data from a public domain by applying the filter function to user's public records of data of the public domain applies the filter function to the public domain data set. That is, the filter constraints are sent by a computing process in the private domain to one or more computing processes in the public domain, over the network link connecting the private network domain to the public network domain and the computing processes running in one or more computers in the public domain apply the filter functions to the public data set and such that the private domain obtains the resulting subset of data. It is noted that the resultant filtered public data set obtained by Step 102 always includes data for users not in the private data to maintain the anonymity.

Because the resultant filtered public data set includes a user's public record data that the private server does not need, Step 103 selects a subset of the user's public records of data that is common with the user's private records of data. In other words, the returned public data is public data corresponding to each of a plurality of individuals. Step 103 selects a set of public record data that has elements in common with the private records. For example, Step 103 can use the names of the private users on the obtained resultant filtered public record data to determine which set of public record data corresponds to the user.

Step 104 performs data mining on the selected subset of the user's public records of data in combination with the user's private records of data to match a user of the private domain to public records of the user of the private domain. That is, Step 104 matches the known private data to the filtered public data to identify data corresponding to a particular user of the private domain and mines the data such that new information from the public domain can be matched to the data of the private domain. For example, the private domain may have age, universities attended, birth place, and social security number of all potential employees and by mining the resultant data, the private domain can obtain all public record data in the public domain of the potential employee without releasing the identity of the users.

For example, if ten users are returned from the public domain as a result of the filtering function of ten universities and the private domain only has eight users, Step 104 will process the resultant filtered public data to remove the data pertaining to the two users not included in the private domain such that all public domain data pertaining to the eight users on which the private domain wanted to receive data can be analyzed.

As exemplarily shown in FIG. 4, only the elements that are included in the clusters defined by the dotted squares will be returned to the public domain such that the returned resultant filtered public data set is significantly smaller than the set of all the public data (e.g., all of the dots in FIG. 4).

Thereby, a storage and processing requirement of the private domain can be reduced because the returned resultant filtered public data is much smaller than the entire public domain data set previously required to be received to maintain anonymity.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 5, computer system/server 12 in cloud computing node 10 is shown in the form of a general-purpose computing circuit. The components of computer system server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer systems/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the data mining system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A data mining method, comprising:
   defining a set of filter constraints as a filter function for clustering private records of data of a private domain into a group including a first user and a second user and corresponding private data;
   obtaining a subset of public records of data in a public domain corresponding to the first user and the second user by applying the filter function to the public records of data thereby querying the public domain using the private records of data of the private domain without revealing an individual identity of the first user and the second user; and on a distributed set of computing machines, acting together to apply the set of filter constraints on the public records of data stored on a cluster of machines and storages, performing data mining within the subset of the public records of data to match the first user of the private domain to a record in the public records in the public domain.

2. A data mining system, comprising:
a processor; and
a memory, the memory storing instructions to cause the processor to perform:
   defining a set of filter constraints as a filter function for clustering private records of data of a private domain into a group including a first user and a second user and corresponding private data;
   obtaining a subset of public records of data in a public domain corresponding to the first user and the second user by applying the filter function to the public records of data thereby querying the public domain using the private records of data of the private domain without revealing an individual identity of the first user and the second user; and
   on a distributed set of computing machines, acting together to apply the set of filter constraints on the public records of data stored on a cluster of machines and storages, performing data mining within the subset of the public records of data to match the first user of the private domain to a record in the public records in the public domain.

3. A non-transitory computer-readable recording medium recording a data mining program, the program causing a computer to perform:
   defining a set of filter constraints as a filter function for clustering private records of data of a private domain into a group including a first user and a second user and corresponding private data;
   obtaining a subset of public records of data in a public domain corresponding to the first user and the second user by applying the filter function to the public records of data thereby querying the public domain using the private records of data of the private domain without revealing an individual identity of the first user and the second user; and
   on a distributed set of computing machines, acting together to apply the set of filter constraints on the public records of data stored on a cluster of machines and storages, performing data mining within the subset of the public records of data to match the first user of the private domain to a record in the public records in the public domain,
   further comprising:
      creating a data file including the matched first user of the private domain to the public records of the first user; and
      leveraging the data file in a query against other public records corresponding to the first user.

4. The method of claim 1, wherein the defining defines the filter function as a ratio of the public records of data to the private records of data being less than 1.05.

5. The method of claim 1, wherein the defining defines the filter function as a ratio of the public records of data to the private records of data being based on a network limitation between the private domain and the public domain, and wherein the public domain has exponentially greater amount of data than the private domain.

6. The method of claim 1, wherein the defining defines the filter function by having obtaining a number of the public records less a predetermined threshold size of obtained data divided by a data size of each of the public records.

7. The method of claim 1, wherein the defining further negotiates the filter function with the public domain as a size of the public records being less than a threshold value.

8. The method of claim 1, wherein the set of data from the public domain includes a greater number of records than a number of private records of data clustered in the private domain in the group.

9. The method of claim 1, wherein an identity of the users corresponding to the private records of data of the private domain is unobtainable by the public domain.

10. The method of claim 1, wherein the defining further negotiates the filter function using an obfuscation function including the set of filter constraints being greater than a first set of filter constraints that overlaps with all of private records of data.

11. The method of claim 1, facilitating a transfer of data between the private domain and the public domain without exchanging the data of the private domain with the public domain.

12. The method of claim 1, wherein the group including a plurality of users and private data is selected based on a single user of which privacy is to be protected.

13. The data mining system of claim 2, wherein the defining defines the filter function as a ratio of the users' public records of data to the private records of data being based on a network limitation between the private domain and the public domain.

14. The data mining system of claim 2, wherein the defining defines the filter function by having obtaining a number of the public records less a predetermined threshold size of obtained data divided by a data size of each of the public records.

15. The data mining system of claim 2, wherein the defining further negotiates the filter function with the public domain as a size of the public records being less than a threshold value.

16. The data mining system of claim 2, wherein the set of data from the public domain includes a greater number of records than a number of private records of data clustered in the private domain in the group.

17. The data mining system of claim 2, wherein an identity of the users corresponding to the private records of data of the private domain is unobtainable by the public domain.

18. The data mining system of claim 2, wherein the defining further negotiates the filter function using an obfuscation function including the set of filter constraints being greater than a first set of filter constraints that overlaps with all of private records of data.

19. The method of claim 1, wherein the query only queries the public records to thereby minimize a total amount of data that is transferred between the public domain and the private domain while allowing for a preservation of privacy of information.

20. The method of claim 1, further comprising:
   creating a data file including the matched first user of the private domain to the public records of the first user; and
   leveraging the data file in a query against other public records corresponding to the first user.

* * * * *